Nov. 15, 1927.
H. GERDIEN
1,648,895
DEVICE FOR MEASURING MICROSCOPICALLY SMALL DISTANCES
Original Filed March 5, 1924
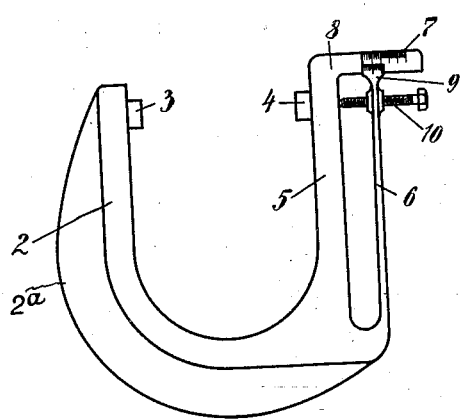
Inventor
Hans Gerdien
by Knight Bros
attorney Patented Nov. 15, 1927.

1,648,895

UNITED STATES PATENT OFFICE.

HANS GERDIEN, OF BERLIN-GRUNEWALD, GERMANY, ASSIGNOR TO SIEMENS & HALSKE, AKTIENGESELLSCHAFT, OF SIEMENSSTADT, NEAR BERLIN, GERMANY, A CORPORATION OF GERMANY.

DEVICE FOR MEASURING MICROSCOPICALLY-SMALL DISTANCES.

Original application filed March 5, 1924, Serial No. 697,038, and in Germany March 6, 1923. Divided and this application filed September 19, 1925. Serial No. 57,386.

My invention relates to a device for measuring microscopically small distances.

According to my invention such microscopically small distances are measured by deforming a member which is deformable with difficulty by the same distance as the distance to be measured and allowing the force necessary for this to act simultaneously on a member which is more easily deformable and the deformation of which can be readily measured, for instance by reading it off on a scale.

The principle involved and the general ideas of the manner in which my invention is reduced to practice are shown and explained in detail in my U. S. Patent No. 1,644,335, dated October 4, 1927, of which the present application is a division, the measuring device disclosed and claimed herein constituting a particular application of my novel idea.

The present invention is illustrated in the accompanying drawing, which shows a so-called gauge or caliper in side elevation, which may serve for measuring the diameter of a shaft or the like. This measuring instrument consists of a main body bent into U-shape comprising the two legs or jaws 2 and 5 and a separate leg or shank 6, preferably integral at its lower end with the yoke or base of the body, and adapted to be yieldingly moved towards or away from the arm 5 by means of a screw 10. Arm 5 is slightly elastic as compared with arm 2, which latter is rigid with the yoke of the instrument, being provided, as shown, with a stiffening rib 2ª. The arm 5 is at its upper end bent to form a continuation 8 at substantially right angles upon which is provided a scale 7. The upper end of shank 6 is adapted to move along this scale when the screw 10 is turned in one direction or the other. To enable readings as accurate as possible to be made upon the scale a vernier 9 is provided upon the end of shank 6. Upon the leg or jaw 2 is mounted a contact piece or lug 3 and upon the leg or jaw 5 a lug 4 between which is placed the body to be measured. If a body is introduced between the two lugs 3 and 4, the diameter of which corresponds with the distance between the lugs 3 and 4 up to a microscopically minute distance, this microscopically small difference in length may be determined by turning the screw 10 whereby the arm 5 as well as shank 6 are deformed until the shaft or the like makes contact with the two lugs 3 and 4. The lug 4 of the leg or jaw 5 has during this deformation traversed the same microscopically short distance which was previously observed as difference in length between the lugs 3 and 4 and the shaft placed between them. During the deformation the end of shank 6 has traversed a multiple of the microscopically short distance to be measured corresponding with the known ratio of elasticity between the leg 5 and shank 6. The distance traversed by the lug 4 during the deformation can therefore be computed from this known ratio of elasticity and the distance traversed by the vernier 9 which can be read off on the scale 7.

Preferably the scale 7 will be so designed with regard to the ratio of elasticity between the arm 5 and shank 6 that it is possible to read off directly the distance traversed by the lug 4 during the deformation of the leg 5.

My invention is, however, by no means limited to the particular form of measuring instrument illustrated by way of example but is applicable to other forms by which microscopically small distances are to be measured.

Various modifications and changes may be made without departing from the spirit and scope of my invention and I desire therefore that only such limitations shall be placed thereon as are imposed by the prior art or set forth in the appended claims.

I claim as my invention:

1. A device for measuring microscopically small distances, comprising two elastic members firmly united at one end, one of said members being adapted to be more easily deformed than the other and the ratio of elasticity of both of said members being known, means for applying the same force to both of said members and means for measuring the elastic deformation of the member more easily deformable, to enable the computation of the deformation of the member more difficult of deformation from the measured value and the known ratio of the elastic deformation of the two members.

2. A device for measuring microscopically small distances, comprising a U-shaped body having two legs, a separate shank firmly united at one end with the lower end of one of said legs and having its other end free, said shank being deformable to a different degree from said leg, an adjusting element connected with said leg and said shank for causing the free ends of said leg and said shank to move towards and away from each other, the leg end having a scale cooperating with said shank end, and upon which scale the relative movement between said leg and said shank ends may be read off for the purpose of determining the extent of deformation of said leg from the deformation of said shank caused by said adjusting element and from the known ratio of elasticity between said leg and said shank.

3. A device for measuring microscopically small distances, comprising a U-shaped body having two legs, a separate shank firmly united at one end with the lower end of one of said legs and having its other end free, said shank running substantially in parallel thereto, said shank being deformable to a different degree from said leg, a screw located between the free ends of said leg and said shank, said screw when rotated causing the ends of said leg and said shank to move towards and away from each other, said leg having a laterally extended end and a scale provided on said extension end and a vernier provided upon said shank end cooperating with said scale to permit the reading off of the relative movement between said leg and shank ends for the purpose of determining the extent of deformation of said leg, and thereby the distance to be measured, from the deformation of said shank caused by said screw, and from the known ratio of elasticity between said leg and said shank.

In testimony whereof I affix my signature.

HANS GERDIEN.